United States Patent
Murayama et al.

(10) Patent No.: US 8,432,596 B2
(45) Date of Patent: Apr. 30, 2013

(54) VIBRATING MIRROR ELEMENT AND OPTICAL SCANNER

(75) Inventors: Manabu Murayama, Daito (JP); Naoki Inoue, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 110 days.

(21) Appl. No.: 13/188,242

(22) Filed: Jul. 21, 2011

(65) Prior Publication Data

US 2012/0026567 A1 Feb. 2, 2012

(30) Foreign Application Priority Data

Aug. 2, 2010 (JP) ................................ 2010-173265

(51) Int. Cl.
*G02B 26/08* (2006.01)
(52) U.S. Cl.
USPC ..................................................... 359/224.1
(58) Field of Classification Search .... 359/199.1–199.4, 359/214.1, 215.1, 223.1–224.1
See application file for complete search history.

(56) References Cited

U.S. PATENT DOCUMENTS

| 7,605,965 B2 * | 10/2009 | Tani et al. ............... 359/224.1 |
| 2004/0113517 A1 | 6/2004 | Smits |
| 2004/0165250 A1 | 8/2004 | Aubuchon |
| 2010/0296147 A1 | 11/2010 | Terada et al. |
| 2011/0122471 A1 | 5/2011 | Terada et al. |

FOREIGN PATENT DOCUMENTS

| JP | 2006-330505 A | 12/2006 |
| JP | 2009-98253 A | 5/2009 |
| JP | 2009-169290 A | 7/2009 |
| JP | 2009-192967 A | 8/2009 |
| JP | 2009-223165 A | 10/2009 |
| WO | WO 2009/028152 A1 | 3/2009 |

OTHER PUBLICATIONS

Extended European Search Report dated Nov. 7, 2011 (six (6) pages).

* cited by examiner

*Primary Examiner* — Euncha Cherry
(74) *Attorney, Agent, or Firm* — Crowell & Moring LLP

(57) ABSTRACT

This vibrating mirror element includes a mirror portion swingable on a first axis, a driving portion, including a free end and a fixed end, for swinging the mirror portion by deformation and a shaft portion provided between the mirror portion and the driving portion to extend along the first axis. The free end of the driving portion is connected to the shaft portion, while the fixed end of the driving portion is fixed on a side of the driving portion closer to the mirror portion and in the vicinity of the shaft portion.

20 Claims, 8 Drawing Sheets

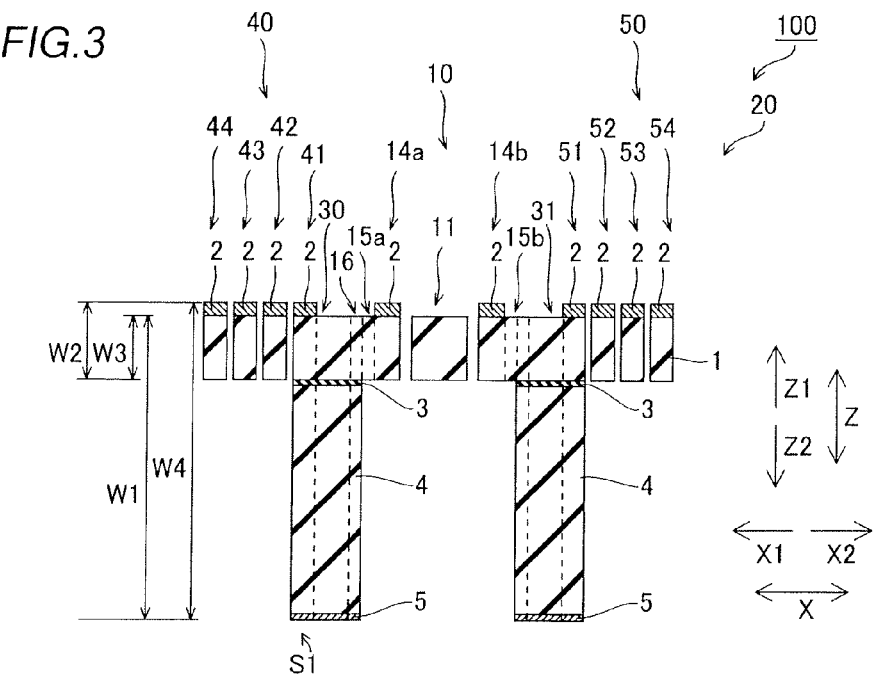
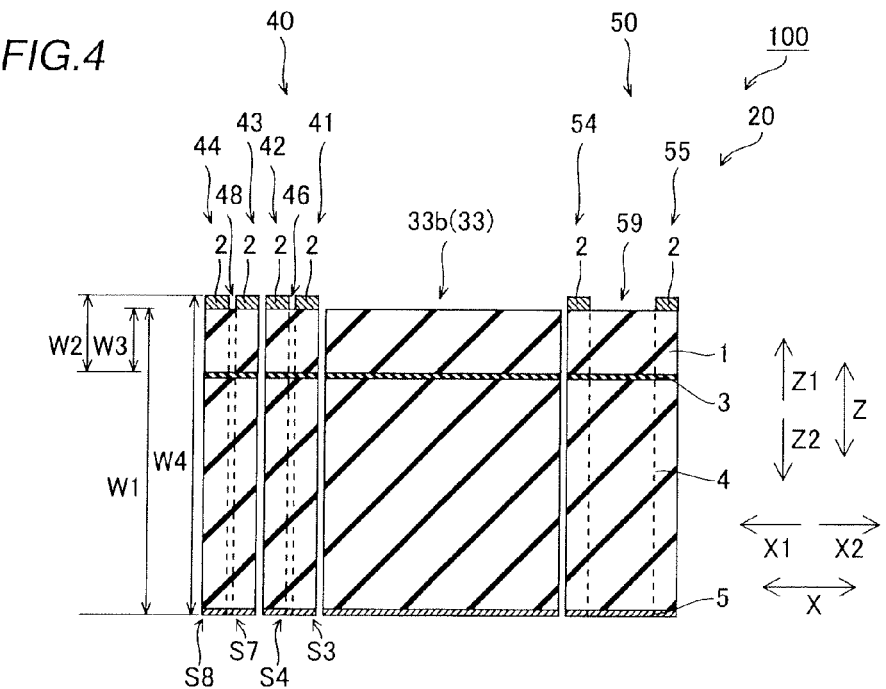

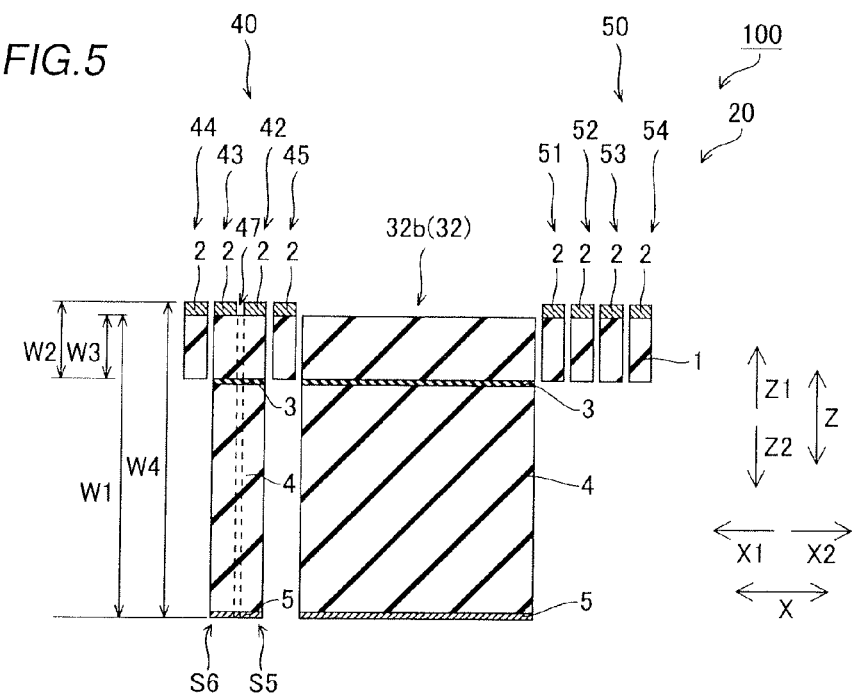
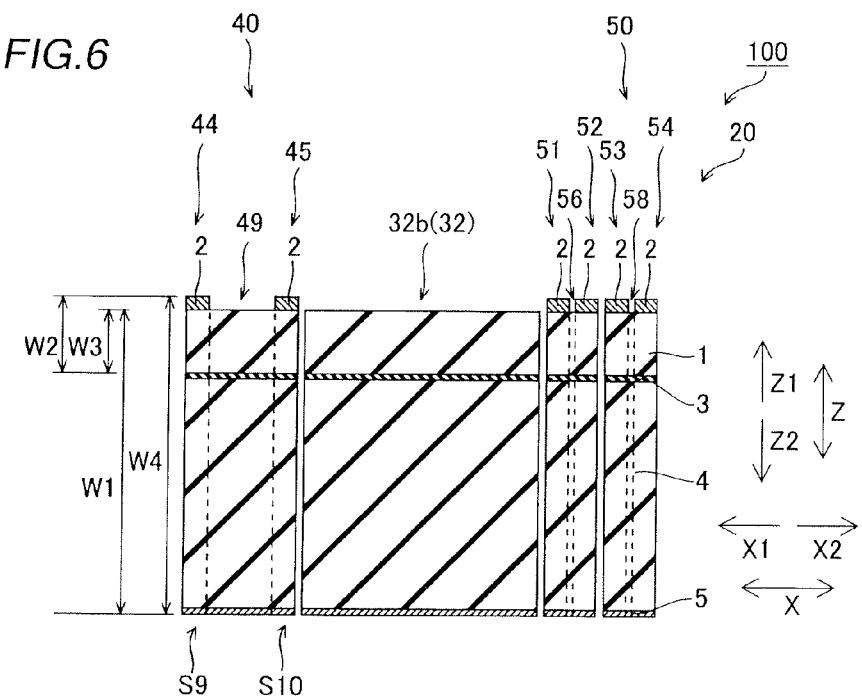

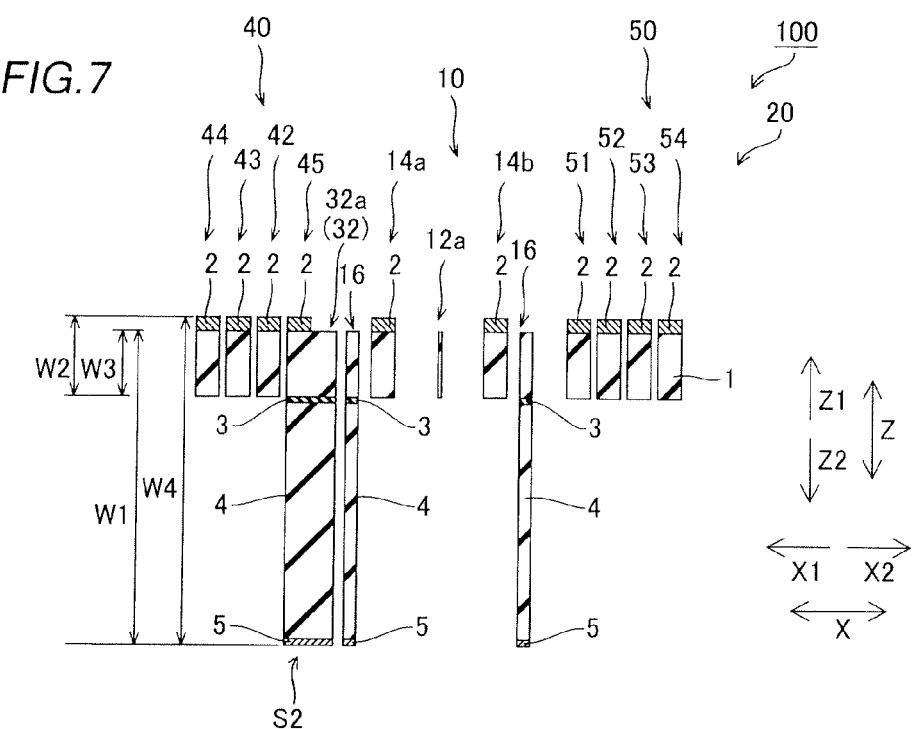
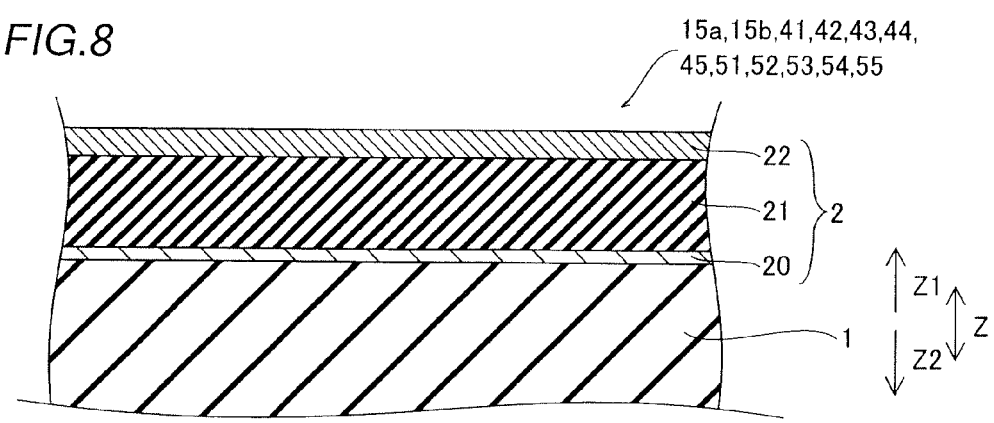

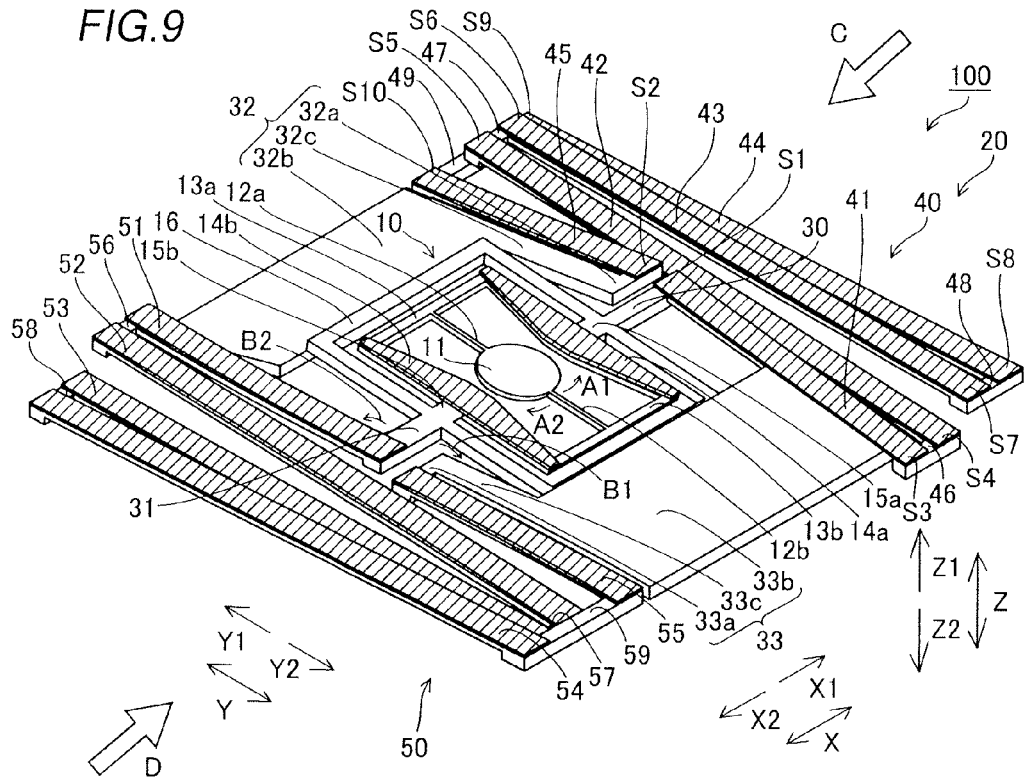

VIBRATING MIRROR ELEMENT AND OPTICAL SCANNER

BACKGROUND OF THE INVENTION

1. Field of the Invention

The present invention relates to a vibrating mirror element and an optical scanner, and more particularly, it relates to a vibrating mirror element including a driving portion having a free end connected to a shaft portion and an optical scanner including the vibrating mirror element.

2. Description of the Background Art

A vibrating mirror element including a driving portion having a free end connected to a shaft portion is known in general, as disclosed in Japanese Patent Laying-Open No. 2009-192967, for example.

The aforementioned Japanese Patent Laying-Open No. 2009-192967 discloses an optical reflecting element (vibrating mirror element) including a mirror portion swingable on an axis extending in a first direction (direction X), an inner frame body connected to the mirror portion and swingable on the axis along with the mirror portion, a shaft portion connected to the inner frame body, a meandering vibrator (driving portion) including a free end and a fixed end, and an outer frame body. In the optical reflecting element disclosed in the aforementioned Japanese Patent Laying-Open No. 2009-192967, the meandering vibrator includes a plurality of piezoelectric actuators extending in a second direction (direction Y) orthogonal to the first direction, and is formed to swing the mirror portion by deforming the piezoelectric actuators. The free end of the meandering vibrator is connected with the inner frame body through the shaft portion on a side closer to the mirror portion in the direction X and on one side in the direction Y. The fixed end of the meandering vibrator is fixed to the outer frame body on a side opposite to the mirror portion in the direction X and at a substantially central portion in the direction Y.

In the optical reflecting element disclosed in the aforementioned Japanese Patent Laying-Open No. 2009-192967, however, the fixed end of the meandering vibrator is fixed to the outer frame body on the side opposite to the mirror portion in the direction X, and hence the fixed end is so separated from the mirror portion in the direction X (extensional direction of the axis) that the size of the optical reflecting element is disadvantageously easily increased in the direction X (extensional direction of the axis). Further, the free end of the meandering vibrator is connected with the shaft portion on one side in the direction Y (direction orthogonal to the axis) while the fixed end of the meandering vibrator is fixed to the support portion at the substantially central portion in the direction Y (direction orthogonal to the axis), and hence the free end and the fixed end are separated from each other in the direction Y (direction orthogonal to the axis). If the plurality of piezoelectric actuators are concavely or convexly deformed in the vertical direction (direction orthogonal to the directions X and Y) when the meandering vibrator does not drive the mirror portion, therefore, the free end disadvantageously inclines with respect to the fixed end due to the separation between the free end and the fixed end in the direction Y. Therefore, the mirror portion connected to the free end also disadvantageously inclines with respect to the fixed end when the meandering vibrator does not drive the mirror portion.

SUMMARY OF THE INVENTION

The present invention has been proposed in order to solve the aforementioned problems, and an object of the present invention is to provide a vibrating mirror element capable of suppressing size increase and capable of inhibiting a mirror portion from inclining with respect to a fixed end in a state not driven by a driving portion and an optical scanner including the vibrating mirror element.

A vibrating mirror element according to a first aspect of the present invention includes a mirror portion swingable on a first axis, a driving portion, including a free end and a fixed end, for swinging the mirror portion by deformation and a shaft portion provided between the mirror portion and the driving portion to extend along the first axis for swingably supporting the mirror portion, and the free end of the driving portion is connected to the shaft portion, while the fixed end of the driving portion is fixed on a side of the driving portion closer to the mirror portion and in the vicinity of the shaft portion.

In the vibrating mirror element according to the first aspect of the present invention, as hereinabove described, the fixed end of the driving portion is fixed on the side of the driving portion closer to the mirror portion, whereby the fixed end is not separated from the mirror portion, but can be fixed between the mirror portion and the driving portion or around the mirror portion. Thus, the vibrating mirror element can be inhibited from size increase in the extensional direction of the first axis. Further, the fixed end of the driving portion is fixed in the vicinity of the shaft portion, whereby the free end and the fixed end are not separated from each other. Thus, the free end can be inhibited from inclining with respect to the fixed end, whereby the mirror portion connected to the free end can be inhibited from inclining with respect to the fixed end when the driving portion does not drive the mirror portion.

The aforementioned vibrating mirror element according to the first aspect preferably further includes a fixing portion fixing the fixed end and including a fixed end support portion arranged between the mirror portion and the driving portion, and the length of the fixed end support portion in the extensional direction of the first axis is preferably smaller than the length of the shaft portion in the extensional direction of the first axis. According to this structure, the length of the fixed end support portion is smaller than the length of the shaft portion in the extensional direction of the first axis, whereby the fixed end support portion can be easily arranged between the mirror portion and the driving portion. Further, the fixed end support portion is so arranged between the mirror portion and the driving portion that the vibrating mirror element can be inhibited from size increase in the extensional direction of the first axis.

In this case, the fixing portion preferably further includes a body portion arranged to be opposed to a side portion of the mirror portion extending along the first axis and a fixing portion connecting portion arranged between the mirror portion and the driving portion for connecting the body portion and the fixed end support portion with each other. According to this structure, the body portion and the fixed end support portion are so connected with each other through the fixing portion connecting portion arranged between the mirror portion and the driving portion that the body portion may not be arranged between the mirror portion and the driving portion. Thus, the space between the mirror portion and the driving portion can be reduced, whereby the vibrating mirror element can be inhibited from size increase in the extensional direction of the first axis.

In the aforementioned vibrating mirror element further including the fixing portion, an outer end portion of the fixing portion in a direction orthogonal to the first axis and an outer end portion of the driving portion in the direction orthogonal to the first axis are preferably formed to substantially coincide with each other in the direction orthogonal to the first axis. According to this structure, the fixing portion does not protrude beyond the driving portion in the direction orthogonal to the first axis, whereby the vibrating mirror element can be inhibited from size increase in the direction orthogonal to the first axis. Further, a sufficient length can be ensured for the fixing portion in the direction orthogonal to the first axis, as compared with a case where the outer end portion of the fixing portion is concaved in the direction orthogonal to the first axis beyond the outer end portion of the driving portion. Thus, the fixing portion can reliably fix the fixed end.

In the aforementioned vibrating mirror element according to the first aspect, the driving portion preferably further includes a deformable first driving portion and a deformable second driving portion provided to extend in a direction orthogonal to the first axis, the first driving portion preferably has the free end while the second driving portion preferably has the fixed end, and an end surface of the free end of the first driving portion and an end surface of the fixed end of the second driving portion are preferably formed to be opposed to each other in the direction orthogonal to the first axis. According to this structure, the fixed end of the driving portion can be easily arranged in the vicinity of the shaft portion connected to the free end. Further, the end surface of the free end of the first driving portion and the end surface of the fixed end of the second driving portion are formed to be opposed to each other, whereby the positions of the first and second driving portions can be inhibited from remarkably deviating from each other in the extensional direction of the first axis. Thus, the vibrating mirror element can be inhibited from size increase in the extensional direction of the first axis.

In the aforementioned vibrating mirror element according to the first aspect, a pair of driving portions and a pair of shaft portions are preferably provided on both sides of the mirror portion in the extensional direction of the first axis, to hold the mirror portion therebetween. Also when the pair of driving portions and the pair of shaft portions are provided to hold the mirror portion therebetween, the fixed ends of the pair of driving portions are so fixed on the side closer to the mirror portion that the vibrating mirror element can be inhibited from size increase in the extensional direction of the first axis.

In this case, the vibrating mirror element preferably further includes a fixing portion fixing the fixed end and including a fixed end support portion arranged between the mirror portion and the driving portions, and the fixing portion is preferably formed to be held between the pair of driving portions in the extensional direction of the first axis. According to this structure, the fixing portion is not arranged on the side of the driving portions opposite to the mirror portion in the extensional direction of the first axis, whereby the vibrating mirror element can be inhibited from size increase in the extensional direction of the first axis.

The aforementioned vibrating mirror element provided with the pair of driving portions and the pair of shaft portions preferably further includes a fixing portion fixing the fixed end and including a fixed end support portion arranged between the mirror portion and the driving portions, a body portion arranged to be opposed to a side portion of the mirror portion extending along the first axis and a fixing portion connecting portion arranged between the mirror portion and the driving portions for connecting the body portion and the fixed end support portion with each other, while a pair of fixing portions are preferably provided, and the body portions of the pair of fixing portions are preferably provided on both sides of the mirror portion in a direction orthogonal to the first axis, to hold the mirror portion therebetween. According to this structure, the different fixing portions can fix the fixed ends of the pair of driving portions respectively, whereby the fixed ends can be more reliably fixed to the fixing portions. When the body portions of the pair of fixing portions are provided on both sides of the mirror portion in the direction orthogonal to the first axis to hold the mirror portion therebetween, the body portions of the pair of fixing portions may not be arranged between the mirror portion and the driving portions, whereby the spaces between the mirror portion and the driving portions can be reduced.

In the aforementioned vibrating mirror element according to the first aspect, the driving portion preferably further includes a deformable first driving portion, a deformable second driving portion and a deformable third driving portion provided to extend in a direction orthogonal to the first axis, and a first connecting portion connecting the first driving portion and the third driving portion with each other and a second connecting portion connecting the second driving portion and the third driving portion with each other, the first driving portion preferably has the free end while the second driving portion preferably has the fixed end, and one end of the third driving portion is preferably connected to an end portion of the first driving portion opposite to the free end through the first connecting portion while another end of the third driving portion is connected to an end portion of the second driving portion opposite to the fixed end through the second connecting portion. According to this structure, the first driving portion and the second driving portion can be connected with each other through the first connecting portion, the third driving portion and the second driving portion. Further, inclinations of the second, third and first driving portions resulting from deformation can be transmitted to the mirror portion through the shaft portion, whereby the mirror portion can be swung with a large inclination.

In this case, the thicknesses of the connecting portions are in excess of the thickness of the first driving portion and the thickness of the second driving portion. According to this structure, the connecting portions can be inhibited from deformation and inclination, whereby the first driving portion can be deformed to incline while substantially maintaining the inclinations of the deformed second and third driving portions. Thus, the inclinations of the second, third and first driving portions can be accumulated, whereby the overall driving portion can be more largely deformed. Consequently, the mirror portion can be swung with a larger inclination.

In the aforementioned vibrating mirror element having the driving portion including the first driving portion, the second driving portion and the third driving portion, the third driving portion is preferably arranged on a side of the first driving portion and the second driving portion opposite to the mirror portion. According to this structure, the free end of the first driving portion and the shaft portion can be located on positions close to each other, while the fixed end of the second driving portion can be easily fixed in the vicinity of the shaft portion. Thus, the vibrating mirror element can be inhibited from size increase in the extensional direction of the first axis.

In the aforementioned vibrating mirror element having the driving portion including the first driving portion, the second driving portion and the third driving portion, the length of the third driving portion in the direction orthogonal to the first axis is preferably larger than the length of the first driving portion in the direction orthogonal to the first axis and the length of the second driving portion in the direction orthogonal to the first axis. According to this structure, the first and second driving portions can be reduced in size to be approximated to each other in the direction orthogonal to the first axis. Thus, the free end of the first driving portion and the shaft portion can be easily connected with each other, while the fixed end of the second driving portion can be easily fixed in the vicinity of the shaft portion. Further, the third driving portion is so increased in size that driving force (inclination) thereof can be increased.

In the aforementioned vibrating mirror element including the third driving portion having the length larger than those of the first and second driving portions, the third driving portion preferably extends in the direction orthogonal to the first axis, to extend over the first driving portion and the second driving portion. According to this structure, the driving force (inclination) of the third driving portion can be more increased.

In the aforementioned vibrating mirror element having the driving portion including the third driving portion, the third driving portion preferably has at least three deformable driving portions provided to extend in the direction orthogonal to the first axis, at least three driving portions are preferably connected with the first driving portion in a manner folded through the first connecting portion or connected with the adjacent driving portions in a manner folded through the third connecting portion on one side in the direction orthogonal to the first axis, and at least three driving portions are preferably connected with the second driving portion in a manner folded through the second connecting portion or connected with the adjacent driving portions in a manner folded through a fourth connecting portion on another side in the direction orthogonal to the first axis. According to this structure, the inclination of the second driving portion can be transmitted to one of at least three driving portions, and the inclinations of at least three driving portions can be accumulated on the inclination of the second driving portion and transmitted to the first driving portion. Thus, the accumulated inclinations of the second driving portion, at least three driving portions and the first driving portion can be transmitted to the mirror portion through the shaft portion, whereby the mirror portion can be swung with a larger inclination.

In the aforementioned vibrating mirror element provided with the pair of driving portions and the pair of shaft portions, the pair of driving portions are preferably formed to be substantially point-symmetrical to each other with respect to the center of the mirror portion, while the pair of shaft portions are preferably formed to be substantially point-symmetrical to each other with respect to the center of the mirror portion. According to this structure, the substantially point-symmetrical pair of driving portions and the substantially point-symmetrical pair of shaft portions can support the mirror portion, whereby the mirror portion can be stably supported, and can be inhibited from rotating on a rotational axis deviating from the first axis.

In the aforementioned vibrating mirror element provided with the pair of driving portions and the pair of shaft portions, the pair of driving portions preferably extend in the direction orthogonal to the first axis and are preferably formed to be substantially line-symmetrical to each other with respect to a centerline passing through the center of the mirror portion, while the pair of shaft portions are formed to be substantially line-symmetrical to each other with respect to the centerline. According to this structure, the substantially line-symmetrical pair of driving portions and the substantially line-symmetrical pair of shaft portions can support the mirror portion, whereby the mirror portion can be stably supported, and can be inhibited from rotating on a rotational axis deviating from the first axis.

In the aforementioned vibrating mirror element according to the first aspect, the mirror portion, the driving portion and the shaft portion are preferably integrally formed. According to this structure, the mirror portion, the driving portion and the shaft portion may not be bonded to each other, whereby joint portions therebetween can be increased in strength, and the manufacturing steps for the vibrating mirror element can be simplified by omitting steps for bonding.

In the aforementioned vibrating mirror element according to the first aspect, the mirror portion preferably includes a mirror and a mirror portion-side driving portion swinging the mirror on a second axis extending in a direction orthogonal to the first axis in an in-plane direction of the mirror. According to this structure, the vibrating mirror element can two-dimensionally optically scan an object with the mirror.

In this case, the driving portion is preferably formed to swing the mirror portion on the first axis at a first frequency, and the mirror portion-side driving portion is preferably formed to swing the mirror on the second axis at a second frequency higher than the first frequency. According to this structure, the vibrating mirror element can two-dimensionally optically scan the object by rotating the mirror on the second axis at a speed higher than that for rotating the mirror portion on the first axis.

An optical scanner according to a second aspect of the present invention includes a light source and an optical scanning portion including a vibrating mirror element, the vibrating mirror element includes a mirror portion swingable on a first axis, a driving portion, including a free end and a fixed end, for swinging the mirror portion by deformation and a shaft portion provided between the mirror portion and the driving portion to extend along the first axis for swingably supporting the mirror portion, and the free end of the driving portion is connected to the shaft portion, while the fixed end of the driving portion is fixed on a side of the driving portion closer to the mirror portion and in the vicinity of the shaft portion.

In the optical scanner according to the second aspect of the present invention, as hereinabove described, the fixed end of the driving portion of the vibrating mirror element is fixed on the side of the driving portion closer to the mirror portion, whereby the fixed end is not separated from the mirror portion, but can be fixed between the mirror portion and the driving portion or around the mirror portion. Thus, the vibrating mirror element can be inhibited from size increase in the extensional direction of the first axis. Further, the fixed end of the driving portion of the vibrating mirror element is fixed in the vicinity of the shaft portion, whereby the free end and the fixed end are not separated from each other. Thus, the free end can be inhibited from inclining with respect to the fixed end, whereby the mirror portion connected to the free end can be inhibited from inclining with respect to the fixed end when the driving portion does not drive the mirror portion.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is an enlarged sectional view of the vibrating mirror element taken along the line 600-600 in FIG. 2;

FIG. 4 is an enlarged sectional view of the vibrating mirror element taken along the line 610-610 in FIG. 2;

FIG. 5 is an enlarged sectional view of the vibrating mirror element taken along the line 620-620 in FIG. 2;

FIG. 6 is an enlarged sectional view of the vibrating mirror element taken along the line 630-630 in FIG. 2;

FIG. 7 is an enlarged sectional view of the vibrating mirror element taken along the line 640-640 in FIG. 2;

FIG. 8 is an enlarged sectional view of a piezoelectric element layer of the vibrating mirror element according to the embodiment of the present invention;

FIG. 9 is a perspective view showing a state where the vibrating mirror element according to the embodiment of the present invention inclines along arrow B1;

FIG. 10 is a side elevational view showing the state where the vibrating mirror element according to the embodiment of the present invention inclines along arrow B1, as viewed along arrow C in FIG. 9;

DESCRIPTION OF THE PREFERRED EMBODIMENTS

An embodiment of the present invention is now described with reference to the accompanying drawings.

First, the structure of a vibrating mirror element 100 according to the embodiment of the present invention is described with reference to FIGS. 1 to 8.

Figure 1:
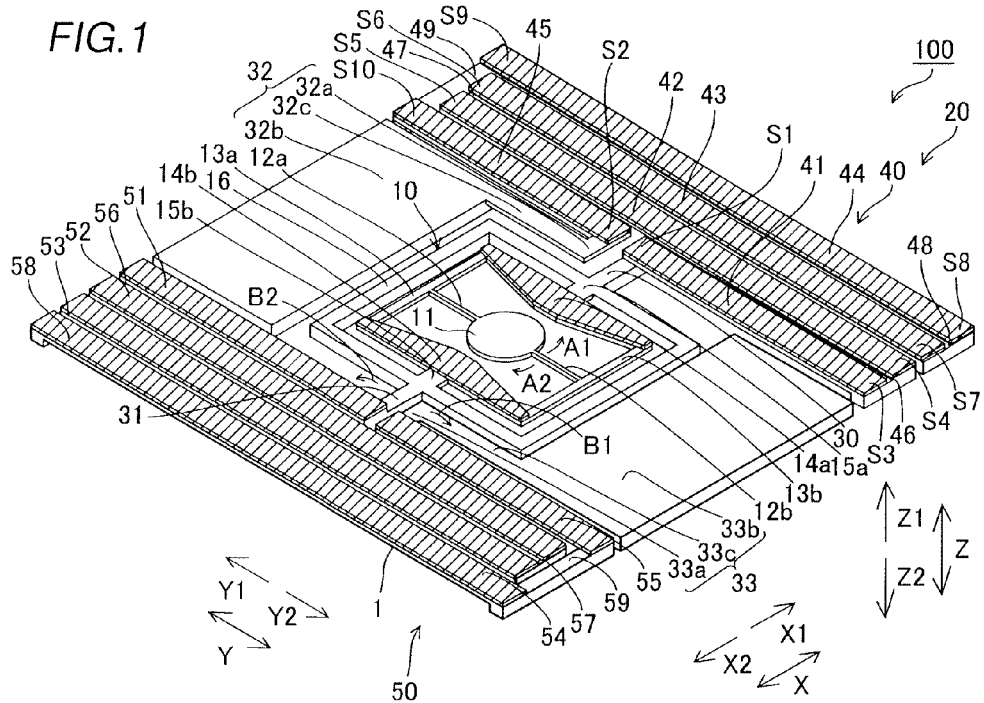
FIG. 1 is a perspective view showing the structure of a vibrating mirror element according to an embodiment of the present invention.
Figure 2:
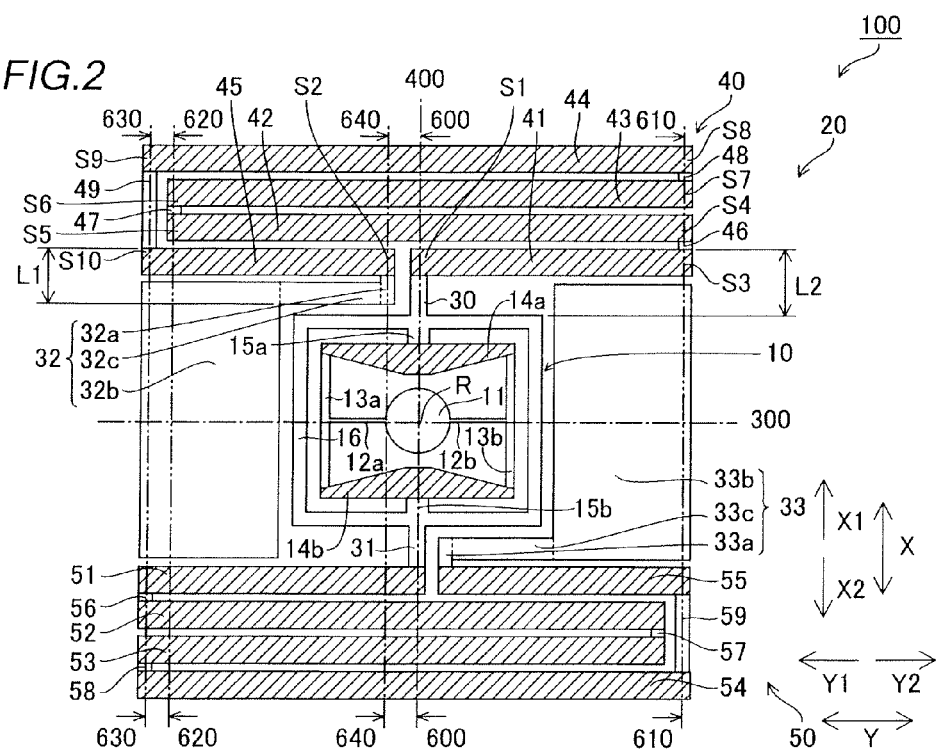
FIG. 2 is a plan view showing the structure of the vibrating mirror element according to the embodiment of the present invention.

The vibrating mirror element 100 according to the embodiment of the present invention includes an A-directional optical scanning portion 10 for optically scanning an object in a direction (along arrows A1 and A2) in a prescribed plane with a mirror 11 described later, a B-directional optical scanning portion 20 for optically scanning the object in a direction along arrows B1 and B2 orthogonal to the direction along arrows A1 and A2 with the mirror 11, rotating shafts 30 and 31 connecting the A-directional optical scanning portion 10 and the B-directional optical scanning portion 20 with each other and fixing portions 32 and 33 for fixing the B-directional optical scanning portion 20, as shown in FIGS. 1 and 2.

The A-directional optical scanning portion 10 is formed to swing the mirror 11 on an axis 300 along arrows A1 and A2, while the B-directional optical scanning portion 20 is formed to swing the A-directional optical scanning portion 10 (mirror 11) on another axis 400 along arrows B1 and B2. The A-directional optical scanning portion 10, the B-directional optical scanning portion 20, the rotating shafts 30 and 31 and the fixing portions 32 and 33 are integrally formed on a common Si substrate 1, as shown in FIG. 1. The A-directional optical scanning portion 10 is an example of the "mirror portion" in the present invention. The axes 300 and 400 are examples of the "second axis" and the "first axis" in the present invention respectively.

The vibrating mirror element 100 is built into an optical operating portion of an apparatus such as a projector (not shown) two-dimensionally optically scanning an object, and formed to optically scan the object with the A-directional optical scanning portion 10 along arrows A1 and A2 and to optically scan the object with the B-directional optical scanning portion 20 along arrows B1 and B2 by reflecting light received from a light source of the optical scanning apparatus. The A-directional optical scanning portion 10 is formed to resonantly drive the mirror 11 at a resonance frequency of about 30 kHz, while the B-directional optical scanning portion 20 is formed to nonresonantly drive the mirror 11 at a frequency of about 60 Hz. The B-directional optical scanning portion 20 is so formed to nonresonantly drive the mirror 11 that there is no change in resonance frequency resulting from temperature change around the vibrating mirror element 100, whereby the same can stably drive the mirror 11 described later. The projector is an example of the "optical scanner" in the present invention. The frequencies of about 30 kHz and about 60 Hz are examples of the "second frequency" and the "first frequency" in the present invention respectively.

The A-directional optical scanning portion 10 includes the mirror 11, torsionally deformable torsion bars 12a and 12b connected with the mirror 11, inclinable bars 13a and 13b connected with the torsion bars 12a and 12b respectively, inner driving portions 14a and 14b connected with the bars 13a and 13b, fixing portions 15a and 15b fixing the inner driving portions 14a and 14b respectively, and a frame body 16 connected with the fixing portions 15a and 15b, as shown in FIGS. 1 and 2. The frame body 16 is formed to surround the mirror 11, the torsion bars 12a and 12b, the bars 13a and 13b, the inner driving portions 14a and 14b and the fixing portions 15a and 15b in plan view, as shown in FIG. 2.

The mirror 11 and the torsion bars 12a and 12b are formed to incline beyond inclinations of the bars 13a and 13b by resonance. The vibrating mirror element 100 is so formed that both of the axes 300 and 400 for optically scanning the object along arrows A1 and A2 and arrows B1 and B2 respectively pass through the center R of the mirror 11. The inner driving portions 14a and 14b are examples of the "mirror portion-side driving portion" in the present invention.

In the inner driving portions 14a and 14b of the A-directional optical scanning portion 10, piezoelectric element layers 2 are formed on the upper surface (along arrow Z1) of the Si substrate 1, as shown in FIG. 3. Thus, the inner driving portions 14a and 14b are formed to be convexly and concavely deformed in a direction Z with respect to the fixed portions 15a and 15b serving as fixed ends respectively upon voltage application, as shown in FIG. 1. The A-directional optical scanning portion 10 is formed to be capable of inclining the mirror 11 on the axis 300 (see FIG. 2) along arrow A1 or A2 by deforming the inner driving portions 14a and 14b in the directions opposite to each other. Thus, the A-directional optical scanning portion 10 is formed to swing the mirror 11 on the axis 300 and to optically scan the object by repeating the deforming operation. The piezoelectric element layers 2 are described later in more detail.

In the frame body 16 of the A-directional optical scanning portion 10, an SiO$_2$ layer 3, an Si layer 4 and a mask layer 5 are provided on the lower surface (along arrow Z2) of the Si substrate 1 in this order from the side along arrow Z1 toward the side along arrow Z2, as shown in FIG. 3. Thus, the thickness W1 of the frame body 16 in the vertical direction (direction Z) is larger than the thickness W2 of the inner driving portions 14a and 14b in the vertical direction, and also larger than the thickness W3 of the mirror 11, the torsion bars 12a and 12b (see FIG. 1), the bars 13a and 13b (see FIG. 1) and the fixing portions 15a and 15b in the vertical direction.

Both of the rotating shafts 30 and 31 are formed on the axis 400 to extend in a direction X along the axis 400, as shown in FIG. 2. The rotating shaft 30 is connected with the frame body 16 of the A-directional optical scanning portion 10 along arrow X1, and connected with a driving unit 40, described later, of the B-directional optical scanning portion 20 along arrow X1. The rotating shaft 31 is connected with the frame body 16 of the A-directional optical scanning portion 10 along arrow X1, and connected with a driving unit 50, described later, of the B-directional optical scanning portion 20 along arrow X2. In other words, both of the rotating shafts 30 and 31 are formed as shafts for the B-directional optical scanning portion 20 swinging the A-directional optical scanning portion 10 (mirror 11) on the axis 400 along arrows B1 and B2. The rotating shafts 30 and 31 are examples of the "shaft portion" in the present invention.

The rotating shafts 30 and 31 formed on the sides of the A-directional optical scanning portion 10 along arrows X1 and X2 respectively are formed to be substantially point-symmetrical to each other with respect to the center R of the mirror 11. In other words, the rotating shaft 31 is arranged in such positional relation that the same substantially overlaps with the rotating shaft 30 when rotated by 180° on the center R of the mirror 11.

The B-directional optical scanning portion 20 includes the driving units 40 and 50 formed on the sides of the A-directional optical scanning portion 10 along arrows X1 and X2 respectively, as shown in FIG. 2. In other words, the driving units 40 and 50 are arranged to hold the A-directional optical scanning portion 10 therebetween in the direction X. The driving units 40 and 50 are examples of the "driving portion" in the present invention.

The driving unit 40 includes five driving portions 41, 42, 43, 44 and 45 and four coupling support portions 46, 47, 48 and 49. The driving unit 50 includes five driving portions 51, 52, 53, 54 and 55 and four coupling support portions 56, 57, 58 and 59. The driving portions 41, 42, 43, 44 and 45 and 51, 52, 53, 54 and 55 are formed to be deformed upon voltage application, while the coupling support portions 46, 47, 48 and 49 and 56, 57, 58 and 59 are formed to remain substantially undeformed.

According to this embodiment, the driving unit 40 is connected with the fixing portion 32, while the driving unit 50 is connected with the fixing portion 33. The fixing portion 32 includes a support portion 32a arranged between the frame body 16 of the A-directional optical scanning portion 10 and the driving unit 40, a body portion 32b arranged on a position opposed to a side portion of the A-directional optical scanning portion 10 extending in the direction X along arrow Y1 and a fixing portion connecting portion 32c, connecting the support portion 32a and the body portion 32b with each other, arranged between the frame body 16 of the A-directional optical scanning portion 10 and the driving unit 40. The fixing portion 33 includes a support portion 33a arranged between the frame body 16 of the A-directional optical scanning portion 10 and the driving unit 50, a body portion 33b arranged on a position opposed to another side portion of the A-directional optical scanning portion 10 extending in the direction X along arrow Y2 and a fixing portion connecting portion 33c, connecting the support portion 33a and the body portion 33b with each other, arranged between the frame body 16 of the A-directional optical scanning portion 10 and the driving unit 50. The support portions 32a and 33a are examples of the "fixed end support portion" in the present invention.

The body portions 32b and 33b of the fixing portions 32 and 33 are arranged to hold the A-directional optical scanning portion 10 therebetween in the direction Y. Further, both of the fixing portions 32 and 33 are formed on positions where the same are held between the driving units 40 and 50 in the direction X.

As shown in FIG. 2, the driving units 40 and 50 formed on the sides of the A-directional optical scanning portion 10 along arrows X1 and X2 respectively are similar in structure to each other, and formed to be substantially point-symmetrical to each other with respect to the center R of the mirror 11. In other words, the driving portions 51, 52, 53, 54 and 55 and the coupling support portions 56, 57, 58 and 59 of the driving unit 50 are arranged in such positional relation that the same substantially overlap with the driving portions 41, 42, 43, 44 an 45 and the coupling support portions 46, 47, 48 and 49 respectively when rotated by 180° on the center R of the mirror 11.

The rotating shafts 30 and 31 formed on the sides of the A-directional optical scanning portion 10 along arrows X1 and X2 respectively are substantially similar in structure to each other, and formed to be substantially point-symmetrical to each other with respect to the center R of the mirror 11. The fixing portions 32 and 33 formed on the sides of the A-directional optical scanning portion 10 along arrows Y1 and Y2 respectively are also similar in structure to each other, and formed to be substantially point-symmetrical to each other with respect to the center R of the mirror 11.

An outer end portion of the body portion 32b of the fixing portion 32 along arrow Y1 and outer end portions of the driving units 40 and 50 along arrow Y1 are formed to substantially coincide with each other as viewed from the direction X, while an outer end portion of the body portion 33b of the fixing portion 33 along arrow Y2 and outer end portions of the driving units 40 and 50 along arrow Y2 are formed to substantially coincide with each other as viewed from the direction X.

Therefore, the structures of the driving unit 40 as well as the rotating shaft 30 and the fixing portion 32 connected with the driving unit 40 are hereinafter described.

The driving portions 41, 42, 43, 44 and 45 of the driving unit 40 are formed to extend in the direction Y orthogonal to the axis 400 together. The coupling support portions 46, 47, 48 and 49 are formed to extend in the direction X along the axis 400 together.

The driving unit 40 is so formed that the four coupling support portions 46, 47, 48 and 49 connect the five driving portions 41, 42, 43, 44 and 45 with each other to constitute one driving portion. Thus, the driving unit 40 is so formed that an end portion, serving as a first end portion of the driving unit 40, of the driving portion 41 along arrow Y1 forms a free end S1 while another end portion, serving as a second end portion of the driving unit 40, of the driving portion 45 along arrow Y2 forms a fixed end S2. The driving portion 41 is an example of the "first driving portion" in the present invention, and the driving portion 45 is an example of the "second driving portion" in the present invention. The driving portions 42, 43 and 44 are examples of the "third driving portion" in the present invention. The coupling support portion 46 is an example of the "first connecting portion" in the present invention, and the coupling support portion 49 is an example of the "second connecting portion" in the present invention. The coupling support portions 47 and 48 are examples of the "third connecting portion" in the present invention.

As the specific structure of the driving unit 40, the driving portions 41 and 45 are arranged to substantially overlap with each other as viewed from the direction Y and formed at a prescribed interval in the direction Y, as shown in FIG. 2. The driving portions 42, 43 and 44 are formed on the side (along arrow X1) of the driving portions 41 and 45 opposite to the A-directional optical scanning portion 10 successively from the side (along arrow X2) of the driving portions 41 and 45 toward the side along arrow X1 at prescribed intervals in the direction X.

The driving portion 41 provided on the side (along arrow X2) of the driving unit 40 closer to the A-directional optical scanning portion 10 is formed to extend from a substantially central portion of the driving unit 40 in the direction Y to an end portion S3 along arrow Y2. This driving portion 41 is connected with the side of the rotating shaft 30 along arrow X1 on the free end S1 along arrow Y1, and connected with the side of the coupling support portion 46 along arrow X2 on the end portion S3 along arrow Y2.

Both of the driving portions 42 and 43 held between the driving portions 41 and 45 and the driving portion 44 are formed to extend from an end portion of the driving unit 40 along arrow Y1 to portions close to another end portion along arrow Y2. The driving portion 42 is connected with a side of the coupling support portion 46 along arrow X1 on an end portion S4 along arrow Y2, and connected with a side of the coupling support portion 47 along arrow X2 on an end portion S5 along arrow Y1. In other words, the driving portion 42 is connected with the driving portion 41 in a manner folded through the coupling support portion 46, and connected with the driving portion 43 in a manner folded through the coupling support portion 47. The driving portion 43 is connected with a side of the coupling support portion 47 along arrow X1 on an end portion S6 along arrow Y1, and connected with a side of the coupling support portion 48 along arrow X2 on an end portion S7 along arrow Y2. In other words, the driving portion 43 is connected with the driving portion 42 in a manner folded through the coupling support portion 47, and connected with the driving portion 44 in a manner folded through the coupling support portion 48.

The driving portion 44 provided on the side (along arrow X1) of the driving unit 40 opposite to the A-directional optical scanning portion 10 is formed to extend from the end portion of the driving unit 40 along arrow Y1 to another end portion along arrow Y2. This driving portion 44 is connected with a side of the coupling support portion 48 along arrow X1 on an end portion S8 along arrow Y2, and connected with a side of the coupling support portion 49 along arrow X1 on an end portion S9 along arrow Y1. In other words, the driving portion 44 is connected with the driving portion 43 in a manner folded through the coupling support portion 48, and connected with the driving portion 45 in a manner folded through the coupling support portion 49.

The driving portion 45 provided on the side (along arrow X2) of the driving unit 40 closer to the A-directional optical scanning portion 10 is formed to extend from the end portion of the driving unit 40 along arrow Y1 to a portion close to the substantially central portion in the direction Y. The driving portion 45 is connected with a side of the coupling support portion 49 along arrow X2 on an end portion S10 along arrow Y1, and connected with the support portion 32a of the fixing portion 32 formed on the side of the driving unit 40 along arrow X2 on the fixed end S2 along arrow Y2. In other words, the support portion 32a fixes the fixed end S2 of the driving unit 40 on the side (along arrow X2) closer to the A-directional optical scanning portion 10 in the vicinity of the rotating shaft 30 located in the vicinity of the substantially central portion in the direction Y.

The driving portions 42, 43 and 44 extend beyond the driving portions 41 and 45 in the direction Y, to extend over the driving portions 41 and 45.

According to this embodiment, both of the free end S1 and the fixed end S2 of the driving unit 40 are formed on the side (along arrow X2) of the driving unit 40 closer to the A-directional optical scanning portion 10, as hereinabove described. Further, an end surface of the free end S1 of the driving portion 41 along arrow Y1 and an end surface of the fixed end S2 of the driving portion 45 along arrow Y2 are arranged to substantially overlap with each other as viewed from the direction Y. In other words, the end surface of the free end S1 of the driving unit 40 along arrow Y1 and the end surface of the fixed end S2 along arrow Y2 are arranged to be opposed to each other in the direction Y.

According to this embodiment, the vibrating mirror element 100 is so formed that the length L1 of the support portion 32a of the fixing portion 32 in the direction X is smaller than the length L2 of the rotating shaft 30 in the direction X. More specifically, the vibrating mirror element 100 is so formed that the length L1 of the support portion 32a from a side surface closer to the A-directional optical scanning portion 10 (along arrow X2) to a side of the fixed end S2 along arrow X1 is smaller than the length L2 from a portion connecting the frame body 16 and the rotating shaft 30 with each other to a side of the free end S1 along arrow X1.

As shown in FIGS. 3 to 7, piezoelectric element layers 2 are formed on the upper surface (along arrow Z1) of the Si substrate 1 in the driving portions 41 to 45, similarly to the inner driving portions 14a and 14b of the A-directional optical scanning portion 10. In other words, the driving portions 41 to 45 are formed to be concavely or convexly deformed in the direction Z upon voltage application.

According to this embodiment, $SiO_2$ layers 3, Si layers 4 and mask layers 5 are provided on the lower surface (along arrow Z2) of the Si substrate 1 from the side along arrow Z1 toward the side along arrow Z2 in the rotating shaft 30 (see FIG. 3), the coupling support portions 46 to 49 (see FIGS. 4 to 6) and the fixing portion 32 (see FIGS. 5 and 6), similarly to the frame body 16 of the A-directional optical scanning portion 10. Thus, the thickness W1 of the rotating shaft 30, the coupling support portions 46 to 49 and the fixing portion 32 in the vertical direction (direction Z) is larger than the thickness W2 of the driving portions 41 to 45 (excluding the free end S1, the fixed end S2 and the end portions S3 to S10) in the vertical direction.

In the free end S1 (see FIG. 3) partially forming the rotating shaft 30, the fixed end S2 (see FIG. 7) partially forming the support portion 32a and the end portions S3 to S10 (see FIGS. 4 to 6) partially forming the coupling support portions 46, 47, 48 and 49, piezoelectric element layers 2 are formed on the upper surface (along arrow Z1) of the Si substrate 1, while $SiO_2$ layers 3, Si layers 4 and mask layers 5 are provided on the lower surface (along arrow Z2) of the Si substrate 1 from the side along arrow Z1 toward the side along arrow Z2. Thus, the thickness W4 of the free end S1, the fixed end S2 and the end portions S3 to S10 in the vertical direction is larger than the thickness W2 of the driving portions 41 to 45 (excluding the free end S1, the fixed end S2 and the end portions S3 to S10) in the vertical direction. The coupling support portions 46 and 49 are examples of the first connecting portion" and the "second connecting portion" in the present invention respectively. The coupling support portions 47 and 48 are examples of the "fourth connecting portion" and the "third connecting portion" in the present invention respectively.

Each piezoelectric element layer 2 has a structure obtained by stacking a lower electrode 20, a piezoelectric body 21 and an upper electrode 22 from the side (along arrow Z2) closer to the Si substrate 1, as shown in FIG. 8. The lower electrode 20, made of Ti or Pt, is formed on the overall upper surface of the Si substrate 1. Thus, wiring on the lower electrode 20 of the piezoelectric element layer 2 can be performed with respect to an arbitrary portion of the Si substrate 1. The thickness of the lower electrode 20 in the vertical direction is sufficiently small with respect to the Si substrate 1, and hence the drawings other than FIG. 8 omit illustration of the lower electrode 20 formed on the upper surface of the Si substrate 1.

The piezoelectric body 21, made of lead zirconate titanate (PZT), is so polarized in the thickness direction (direction Z) that the same expands/contracts upon voltage application. The upper electrode 22 is made of a conductive metallic material such as Al, Cr, Cu, Au or Pt.

In the driving unit 40, the driving portions 41 to 45 are formed to be deformed and to drive the A-directional optical scanning portion 10 upon voltage application. Further, the driving portions 41 to 45 are so formed that a voltage applied to the driving portions 41, 43 and 45 and that applied to the driving portions 42 and 44 are out of phase with each other.

The driving portion 45 of the driving unit 40 has a cantilever structure having the fixed end S2 and the end portion S10 serving as a free end, as shown in FIGS. 1 and 2. Thus, the driving portion 45 is formed to be deformed in a warping manner thereby displacing the end portion S10 in the direction Z (see FIG. 1) and inclining the same when driving the A-directional optical scanning portion 10. At this time, the fixed end S2 remains undisplaced when the driving portion 45 drives the A-directional optical scanning portion 10. Thus, the driving portion 45 is so formed that the end portion S10 inclines with respect to the fixed end S2. The coupling support portion 49 connecting the driving portions 45 and 44 with each other is formed to be substantially undeformed, thereby supporting the end portion S9 while maintaining the inclination of the end portion S10.

The driving portion 44 has a cantilever structure having the end portion S9 serving as a fixed end and the end portion S8 serving as a free end. Thus, the end portion S8 inclines with respect to the end portion S9. The coupling support portion 48 is formed to support the end portion S7 while maintaining the inclination of the end portion S8.

The driving portion 43 has a cantilever structure having the end portion S7 serving as a fixed end and the end portion S6 serving as a free end. Thus, the driving portion 43 is so formed that the end portion S7 inclines with respect to the end portion S6. The coupling support portion 47 is formed to support the end portion S5 while maintaining the inclination of the end portion S6.

The driving portion 42 has a cantilever structure having the end portion S5 serving as a fixed end and the end portion S4 serving as a free end. Thus, the driving portion 42 is so formed that the end portion S5 inclines with respect to the end portion S4. The coupling support portion 46 is formed to support the end portion S3 while maintaining the inclination of the end portion S4.

The driving portion 41 has a cantilever structure having the end portion S3 serving as a fixed end and the free end S1. Thus, the driving portion 41 is so formed that the free end S1 inclines with respect to the end portion S3. Consequently, the driving portion 41 is so formed that the free end S1 inclines the rotating shaft 30 and the A-directional optical scanning portion 10 while accumulating the inclinations of the driving portions 41 to 45.

According to this embodiment, the B-directional optical scanning portion 20 is so formed that voltages in phase with each other are applied to the driving portions 41, 43 and 45 of the driving unit 40 and the driving portions 52 and 54 of the driving unit 50. Further, the B-directional optical scanning portion 20 is so formed that voltages in phase with each other are applied to the driving portions 42 and 44 of the driving unit 40 and the driving portions 51, 53 and 55 of the driving unit 50. In addition, the B-directional optical scanning portion 20 is so formed that voltages out of phase with each other are applied to the driving portions 41, 43, 45, 52 and 54 and the driving portions 42, 44, 51, 53 and 55. Consequently, the B-directional optical scanning portion 20 is so formed that the driving units 40 and 50 drive the A-directional optical scanning portion 10 reversely to each other.

The driving units 40 and 50, formed to be substantially point-symmetrical to each other with respect to the center R of the mirror 11, can incline the rotating shafts 30 and 31 connected therewith in the same direction on the axis 400. Thus, The driving units 40 and 50 are formed to be capable of rotating the A-directional optical scanning portion 10 connected with the rotating shafts 30 and 31 on the axis 400 along arrow B1 or B2 (see FIG. 1).

A driving operation of the B-directional optical scanning portion 20 of the vibrating mirror element 100 according to the embodiment of the present invention is now described with reference to FIGS. 1, 2 and 9 to 12.

From the state where the driving units 40 and 50 do not drive the A-directional optical scanning portion 10 and are kept horizontal as shown in FIGS. 1 and 2, a voltage for contracting the upper surface side (along arrow Z1) of the piezoelectric element layers 2 beyond the lower surface side (along arrow Z2) is applied to the driving portions 41, 43 and 45 of the driving unit 40 and the driving portions 52 and 54 of the driving unit 50, as shown in FIG. 9. On the other hand, another voltage, out of phase with that applied to the driving portions 41, 43, 45, 52 and 54, for contracting the lower surface side (along arrow Z2) of the piezoelectric element layers 2 beyond the upper surface side (along arrow Z1) is applied to the driving portions 42 and 44 of the driving unit 40 and the driving portions 51, 53 and 55 of the driving unit 50.

Thus, the driving portions 41, 43 and 45 are so deformed that the free end S1 and the end portions S6 and S10 incline upward (along arrow Z1) with respect to the end portions S3 and S7 and the fixed end S2 respectively in the driving unit 40, as shown in FIG. 10. On the other hand, the driving portions 42 and 44 are so deformed that the end portions S4 and S8 incline downward (along arrow Z2) with respect to the end portions S5 and S9 respectively. Consequently, the rotating shaft 30 connected with the free end S1 inclines the A-directional optical scanning portion 10 so that the side along arrow Y1 is located upward (along arrow Z1) beyond the side along arrow Y2 while accumulating the inclinations of the driving portions 41 to 45.

Figure 11:
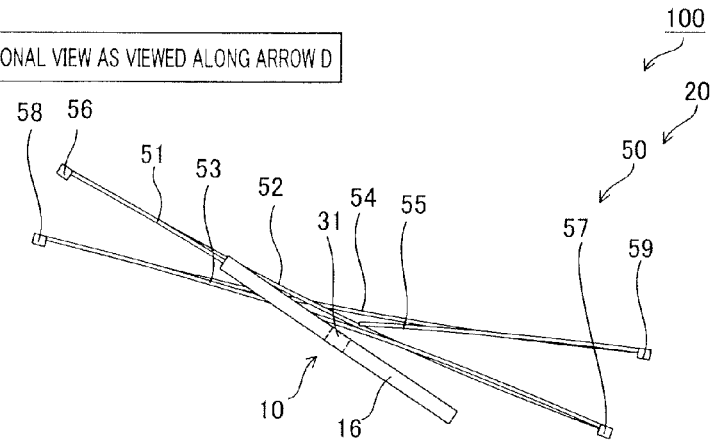
FIG. 11 is a side elevational view showing the state where the vibrating mirror element according to the embodiment of the present invention inclines along arrow B1, as viewed along arrow D in FIG. 9.

The driving unit 50 drives the A-directional optical scanning portion 10 reversely to the driving unit 40, whereby the rotating shaft 31 inclines the A-directional optical scanning portion 10 so that the side along arrow Y1 is located upward (along arrow Z1) beyond the side along arrow Y1 while accumulating the inclinations of the driving portions 51 to 55, as shown in FIG. 11. Thus, the A-directional optical scanning portion 10 is rotated on the axis 400 along arrow B1.

Figure 12:
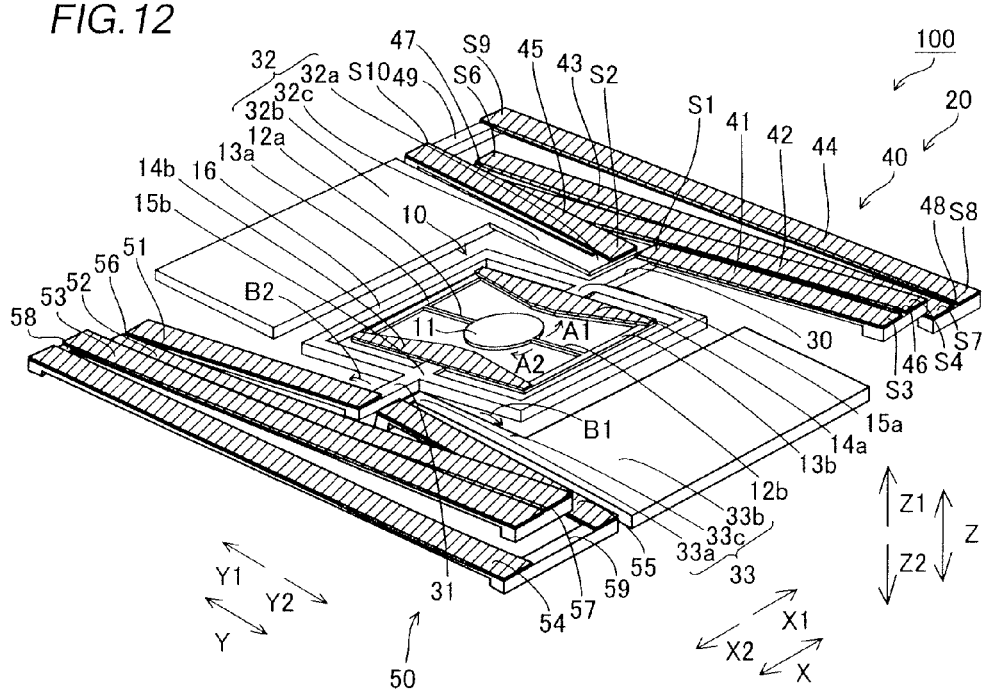
FIG. 12 is a perspective view showing a state where the vibrating mirror element according to the embodiment of the present invention inclines along arrow B2.

From the state where the driving units 40 and 50 do not drive the A-directional optical scanning portion 10 and are kept horizontal as shown in FIGS. 1 and 2, a voltage for contracting the lower surface side (along arrow Z2) of the piezoelectric element layers 2 beyond the upper surface side (along arrow Z1) is applied to the driving portions 41, 43 and 45 of the driving unit 40 and the driving portions 52 and 54 of the driving unit 50, as shown in FIG. 12. On the other hand, another voltage, out of phase with that applied to the driving portions 41, 43, 45, 52 and 54, for contracting the upper surface side (along arrow Z1) of the piezoelectric element layers 2 beyond the lower surface side (along arrow Z2) is applied to the driving portions 42 and 44 of the driving unit 40 and the driving portions 51, 53 and 55 of the driving unit 50.

Thus, the driving unit 40 deforms reversely to the state shown in FIGS. 9 and 10, whereby the rotating shaft 30 so inclines the A-directional optical scanning portion 10 that the side along arrow Y1 is located downward (along arrow Z1) beyond the side along arrow Y2 while accumulating the inclinations of the driving portions 41 to 45. The driving unit 50 drives the A-directional optical scanning portion 10 reversely to the driving unit 40, whereby the rotating shaft 31 inclines the A-directional optical scanning portion 10 so that the side along arrow Y1 is located downward (along arrow Z1) beyond the side along arrow Y2 while accumulating the inclinations of the driving portions 51 to 55. Thus, the A-directional optical scanning portion 10 is rotated on the axis 400 along arrow B2.

The driving units 40 and 50 swing the A-directional optical scanning portion 10 on the axis 400 by repeating the aforementioned driving operations. The driving units 40 and 50 can swing the mirror 11 on the axis 300 while swinging the same on the axis 400 by driving the A-directional optical scanning portion 10 simultaneously with the B-directional optical scanning portion 20.

Steps of manufacturing the vibrating mirror element 100 according to the embodiment of the present invention are now described with reference to FIGS. 8, 13 and 14.

Figure 13:
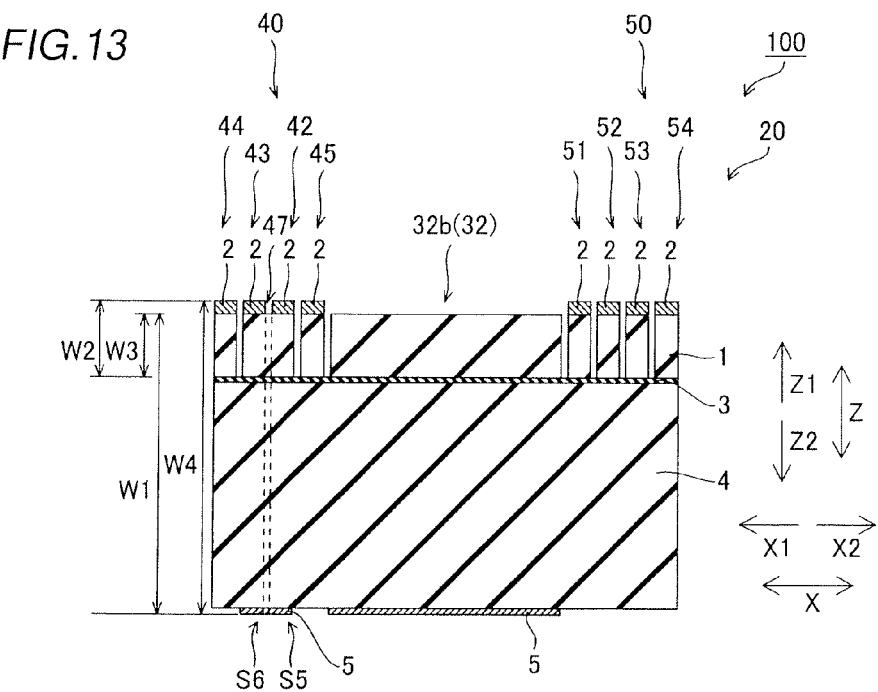
FIGS. 13 and 14 are sectional views for illustrating a manufacturing process for the vibrating mirror element taken along the line 620-620 in FIG. 2.

First, a motherboard is prepared by providing an SiO$_2$ layer 3 and an Si layer 4 on the lower surface (along arrow Z2) of the Si substrate 1 in this order, as shown in FIG. 13. Then, lower electrodes 20 and piezoelectric bodies 21 (see FIG. 8) are successively formed on the overall upper surface (along arrow Z1) of the motherboard by sputtering or the like. Then, upper electrodes 22 (see FIG. 8) are formed on the upper surfaces of the piezoelectric bodies 21 corresponding to the inner driving portions 14*a* and 14*b* (see FIG. 3), the driving portions 41, 42, 43, 44, 45, 51, 52, 53, 54 and 55 (see FIG. 3) by vapor deposition or the like. Thus, the piezoelectric element layers 2 (see FIGS. 3 to 7) are formed on the inner driving portions 14*a* and 14*b* and the driving portions 41 to 45 and 51 to 55.

Then, resist patterns (not shown) are formed on positions corresponding to the inner driving portions 14*a* and 14*b* and the driving portions 41 to 45 and 51 to 55, and wet etching or the like is thereafter performed through the resist patterns serving as masks, thereby removing portions of the piezoelectric bodies 21 formed on positions other than those corresponding to the inner driving portions 14*a* and 14*b* and the driving portions 41 to 45 and 51 to 55. Thereafter mask layers 5 made of Al, Cr or Cu are formed on positions of the lower surface (along arrow Z2) of the motherboard (Si layer 4) corresponding to the frame body 16, the rotating shafts 30 and 31, the coupling support portions 46 to 49 and 56 to 59 and the fixing portions 32 and 33 by vapor deposition or the like.

Then, a resist pattern (not shown) is formed on a position corresponding to the vibrating mirror element 100 by photolithography and thereafter employed as a mask for removing portions of the lower electrodes 20 formed on positions other than that corresponding to the vibrating mirror element 100 by reactive ion etching (RIE) or the like. Thereafter portions of the Si substrate 1 formed on positions other than that corresponding to the vibrating mirror element 100 are removed by reactive ion etching (RIE) or the like.

Figure 14:
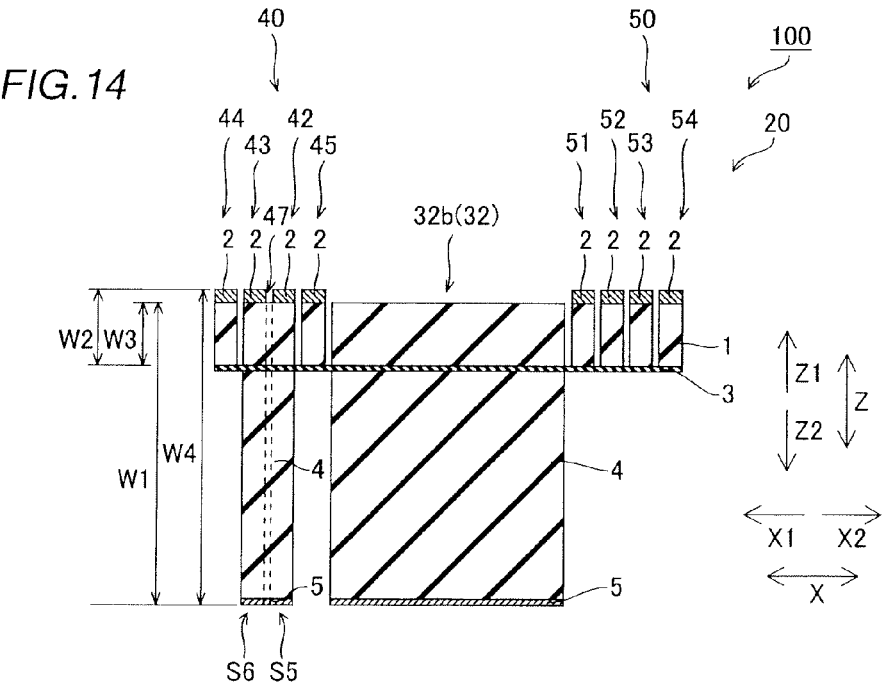

Then, portions of the Si layer 4 formed on positions other than those corresponding to the frame body 16, the rotating shafts 30 and 31, the coupling support portions 46 to 49 and 56 to 59 and the fixing portions 32 and 33 are removed through mask layers 5 by reactive ion etching (RIE) or the like, as shown in FIG. 14. At this time, portions of the Si layer 4 formed on positions corresponding to the free end S1, the fixed end S2 and the end portions S3 to S10 of the driving unit 40 and those corresponding to the free end, the fixed end and the end portions of the driving unit 50 are mot removed. Thereafter portions of the SiO$_2$ layer 3 formed on the positions other than that corresponding to the vibrating mirror element 100 are removed by reactive ion etching (RIE) or the like. Thus, the vibrating mirror element 100 shown in FIG. 8 is formed.

According to this embodiment, as hereinabove described, the support portion 32*a* fixes the fixed end S2 of the driving unit 40 on the side (along arrow X2) closer to the A-directional optical scanning portion 10, whereby the fixed end S2 is not separated from the A-directional optical scanning portion 10, but can be fixed between the A-directional optical scanning portion 10 and the driving unit 40 or around the A-directional optical scanning portion 10. Thus, the vibrating mirror element 100 can be inhibited from size increase in the extensional direction (direction X) of the axis 400. Further, the support portion 32*a* fixes the fixed end S2 of the driving unit 40 in the vicinity of the rotating shaft 30 positioned in the vicinity of the substantially central portion in the direction Y, whereby the free end S1 and the fixed end S2 are not separated from each other. Thus, the free end S1 can be inhibited from inclining with respect to the fixed end S2, whereby the A-directional optical scanning portion 10 connected with the free end S1 can also be inhibited from inclining with respect to the fixed end S2 when the driving unit 40 does not drive the A-directional optical scanning portion 10.

According to this embodiment, as hereinabove described, the length L1 of the support portion 32*a* in the direction X is set smaller than the length L2 of the rotating shaft 30 in the direction X, whereby the support portion 32*a* can be easily arranged between the A-directional optical scanning portion 10 and the driving unit 40. Further, the support portion 32*a* is so arranged between the A-directional optical scanning portion 10 and the driving unit 40 that the vibrating mirror element 100 can be inhibited from size increase in the direction X.

According to this embodiment, as hereinabove described, the fixed portion 32 is formed to include the body portion 32*b* arranged on the position opposed to the side portion of the A-directional optical scanning portion 10 extending in the direction X along arrow Y1 and the fixing portion connecting portion 32*c*, connecting the support portion 32*a* and the body portion 32*b* with each other, arranged between the frame body 16 of the A-directional optical scanning portion 10 and the driving unit 40. Further, the fixing portion 33 is formed to include the body portion 33*b* arranged on the position opposed to the other side portion of the A-directional optical scanning portion 10 extending in the direction X along arrow Y2 and the fixing portion connecting portion 33*c*, connecting the support portion 33*a* and the body portion 33*b* with each other, arranged between the frame body 16 of the A-directional optical scanning portion 10 and the driving unit 50. Thus, the body portion 32*a* (33*b*) and the support portion 32*a* (33*a*) are so connected with each other through the fixing portion connecting portion 32*c* (33*c*) arranged between the A-directional optical scanning portion 10 and the driving unit 40 (50) that the body portion 32*a* (33*b*) may not be arranged between the A-directional optical scanning portion 10 and the driving unit 40 (50). Therefore, the space between the A-directional optical scanning portion 10 and the driving unit 40 (50) can be reduced, whereby the vibrating mirror element 100 can be inhibited from size increase in the extensional direction of the axis 400.

According to this embodiment, as hereinabove described, the outer end portion of the body portion 32*b* of the fixing portion 32 along arrow Y1 and those of the driving units 40 and 50 along arrow Y1 substantially coincide with each other as viewed from the direction X while the outer end portion of the body portion 33b of the fixing portion 33 along arrow Y2 and those of the driving units 40 and 50 along arrow Y2 substantially coincide with each other as viewed from the direction X so that the fixed portions 32 and 33 do not protrude beyond the driving units 40 and 50 in the direction Y, whereby the vibrating mirror element 100 can be inhibited from size increase in the direction Y. Further, sufficient lengths can be ensured for the fixing portions 32 and 33 in the direction Y, as compared with a case where the outer end portion of the body portion 32b along arrow Y1 is concaved along arrow Y2 beyond those of the driving units 40 and 50 along arrow Y1 and a case where the outer end portion of the body portion 33b along arrow Y2 is concaved along arrow Y1 beyond those of the driving units 40 and 50 along arrow Y2. Thus, the fixing portions 32 and 33 can reliably fix the fixed end S2.

According to this embodiment, as hereinabove described, the end surface of the free end S1 of the driving portion 41 along arrow Y1 and that of the fixed end S2 of the driving portion 45 along arrow Y2 are arranged to substantially overlap with each other as viewed from the direction Y, whereby the fixed end S2 can be easily arranged on the side (along arrow X2) of the driving unit 40 closer to the A-directional optical scanning portion 10 and in the vicinity of the rotating shaft 30 connected with the free end S1. Further, the end surface of the free end S1 along arrow Y1 and that of the fixed end S2 along arrow Y2 are opposed to each other, whereby the positions of the driving portions 41 and 45 can be inhibited from remarkably deviating from each other in the direction X. Thus, the vibrating mirror element 100 can be inhibited from size increase in the direction X.

According to this embodiment, as hereinabove described, the fixed ends of the driving units 40 and 50 are fixed on the side (along arrow X2) closer to the A-directional optical scanning portion 10 also in the case where the driving unit 40 and the rotating shaft 30 are arranged on the side of the A-directional optical scanning portion 10 along arrow X1 and the driving unit 50 and the rotating shaft 31 are formed on the side of the A-directional optical scanning portion 10 along arrow X2, whereby the vibrating mirror element 100 can be inhibited from size increase in the direction X.

According to this embodiment, as hereinabove described, both of the fixing portions 32 and 33 are formed on the positions held between the driving units 40 and 50 in the direction X so that the fixing portions 32 and 33 are not arranged on the sides (along arrows X1 and X2) of the driving units 40 and 50 opposite to the A-directional optical scanning portion 10 in the direction X, whereby the vibrating mirror element 100 can be inhibited from size increase in the direction X.

According to this embodiment, as hereinabove described, the body portions 32b and 33b of the fixing portions 32 and 33 are arranged to hold the A-directional optical scanning portion 10 therebetween in the direction Y so that the different fixing portions 32 and 33 can fix the fixed ends S2 of the driving units 40 and 50 respectively, whereby the fixed ends S2 can be more reliably fixed to the fixing portions 32 and 33. Further, the body portions 32b and 33b of the fixing portions 32 and 33 may not be arranged between the A-directional optical scanning portion 10 and the driving units 40 and 50, whereby the spaces between the A-directional optical scanning portion 10 and the driving units 40 and 50 can be reduced.

According to this embodiment, as hereinabove described, the driving unit 40 is so formed that the four coupling support portions 46, 47, 48 and 49 connect the five driving portions 41, 42, 43, 44 and 45 with each other to constitute one driving portion, whereby the end portion of the driving portion 41 along arrow Y1 serving as the first end portion of the driving unit 40 forms the free end S1 while the end portion of the driving portion 45 along arrow Y2 serving as the second end portion of the driving unit 40 forms the fixed end S2. Further, the driving portions 42 and 44 are connected with the driving portions 41 and 45 through the coupling support portions 46 and 49 respectively. Thus, the driving portions 41 and 45 can be connected with each other through the coupling support portion 46, the driving portions 42, 43 and 44 and the coupling support portion 49. In addition, inclinations of the driving portions 45, 42, 43, 44 and 41 by deformation can be transmitted to the A-directional optical scanning portion 10 through the rotating shaft 30, whereby the A-directional optical scanning portion 10 can be swung with a large inclination.

According to this embodiment, as hereinabove described, the thickness W1 of the coupling support portions 46 to 49 in the vertical direction (direction Z) is set larger than the thickness W2 of the driving portions 41 to 45 in the vertical direction while the thickness W4 of the free end S1, the fixed end S2 and the end portions S3 to S10 in the vertical direction is set larger than the thickness W2 of the driving portions 41 to 45 in the vertical direction so that the coupling support portions 46 to 49 can be inhibited from deformation and inclination, whereby the connected driving portions 41 to 44 can be deformed to incline while substantially maintaining the inclinations in the deformed driving portions 42 to 45. Thus, the inclinations of the driving portions 41 to 45 can be accumulated, whereby the overall driving unit 40 can be more largely deformed. Consequently, the A-directional optical scanning portion 10 can be swung with a larger inclination. Further, the thickness W1 of the coupling support portions 46 to 49 in the vertical direction (direction Z) is so increased that the lengths of the coupling support portions 46 to 49 in the direction (direction Y) orthogonal to the axis 400 can be reduced while maintaining rigidity of the coupling support portions 46 to 49. Thus, the driving portions 41 to 45 can be more lengthened in the direction Y, whereby driving force thereof can be increased. Consequently, the A-directional optical scanning portion 10 can be more inclined.

According to this embodiment, as hereinabove described, the driving portions 42, 43 and 44 are formed on the side (along arrow X1) of the driving portions 41 and 45 opposite to the A-directional optical scanning portion 10 successively from the side (along arrow X2) of the driving portions 41 and 45 toward the side along arrow X1 at the prescribed intervals in the direction X, whereby the free end S1 of the driving portion 41 and the rotating shaft 30 can be positioned closer to each other while the fixed end S2 of the driving portion 45 can be easily fixed in the vicinity of the rotating shaft 30. Thus, the vibrating mirror element 100 can be inhibited from size increase in the direction X.

According to this embodiment, as hereinabove described, the driving portions 42, 43 and 44 are formed to extend beyond the driving portions 41 and 45 in the direction Y to extend over the driving portions 41 and 45, whereby the driving portions 41 and 45 can be reduced in size to be approximated to each other in the direction orthogonal to the axis 400. Thus, the free end S1 of the driving portion 41 and the rotating shaft 30 can be easily connected with each other, and the fixed end S2 of the driving portion 45 can be easily fixed in the vicinity of the rotating shaft 30. Further, the driving portions 42, 43 and 44 are so increased in size that driving force (inclinations) thereof can be increased.

According to this embodiment, as hereinabove described, the driving portion 42 is connected with the driving portion 41 in the manner folded through the coupling support portion 46, and connected with the driving portion 43 in the manner folded through the coupling support portion 47. Further, the driving portion 43 is connected with the driving portion 42 in the manner folded through the coupling support portion 47, and connected with the driving portion 44 in the manner folded through the coupling support portion 48. In addition, the driving portion 44 is connected with the driving portion 43 in the manner folded through the coupling support portion 48, and connected with the driving portion 45 in the manner folded through the coupling support portion 49. Thus, the inclination of the driving portion 45 can be transmitted to the driving portion 44, and the inclinations of the driving portions 42, 43 and 44 can be accumulated to the inclination of the driving portion 45 and transmitted to the driving portion 41. Therefore, the inclinations of the driving portions 45, 42, 43, 44 and 41 can be accumulated and transmitted to the A-directional optical scanning portion 10 through the rotating shaft 30, whereby the A-directional optical scanning portion 10 can be swung with a larger inclination.

According to this embodiment, as hereinabove described, the driving units 40 and 50 provided on the sides of the A-directional optical scanning portion 10 along arrows X1 and X2 respectively are formed to be substantially point-symmetrical to each other with respect to the center R of the mirror 11 while the rotating shafts 30 and 31 provided on the sides of the A-directional optical scanning portion 10 along arrows X1 and X2 respectively are formed to be substantially point-symmetrical to each other with respect to the center R of the mirror 11. Thus, the substantially point-symmetrical driving units 40 and 50 and the substantially point-symmetrical rotating shafts 30 and 31 can support the A-directional optical scanning portion 10, whereby the A-directional optical scanning portion 10 can be stably supported, and can be inhibited from rotating on a rotational axis deviating from the axis 400.

According to this embodiment, as hereinabove described, the A-directional optical scanning portion 10, the B-directional optical scanning portion 20 including the driving units 40 and 50, the rotating shafts 30 and 31 and the fixing portions 32 and 33 are integrally formed on the common Si substrate 1 so that the A-directional optical scanning portion 10, the driving units 40 and 50, the rotating shafts 30 and 31 and the fixing portions 32 and 33 may not be bonded to each other, whereby joint portions therebetween can be increased in strength, and the manufacturing steps for the vibrating mirror element 100 can be simplified by omitting steps for bonding.

According to this embodiment, as hereinabove described, the A-directional optical scanning portion 10 includes the mirror 11 and the inner driving portions 14a and 14b capable of inclining the mirror 11 on the axis 300 along arrow A1 or A2, whereby the vibrating mirror element 100 can two-dimensionally optically scan the object with the mirror 11.

According to this embodiment, as hereinabove described, the A-directional optical scanning portion 10 is formed to resonantly drive the mirror 11 at the resonance frequency of about 30 kHz while the B-directional optical scanning portion 20 is formed to nonresonantly drive the mirror 11 at the frequency of about 60 Hz, whereby the vibrating mirror element 100 can two-dimensionally optically scan the object by rotating the mirror 11 on the axis 300 at a speed higher than that for rotating the A-directional optical scanning portion 10 on the axis 400.

Although the present invention has been described and illustrated in detail, it is clearly understood that the same is by way of illustration and example only and is not to be taken by way of limitation, the spirit and scope of the present invention being limited only by the terms of the appended claims.

For example, while the vibrating mirror element 100 is so formed that the driving units 40 and 50 similar in structure to each other are formed to be substantially point-symmetrical to each other with respect to the center R of the mirror 11 and the fixing portions 32 and 33 similar in structure to each other are also formed to be substantially point-symmetrical to each other with respect to the center R of the mirror 11 in the aforementioned embodiment, the present invention is not restricted to this.

Figure 15:
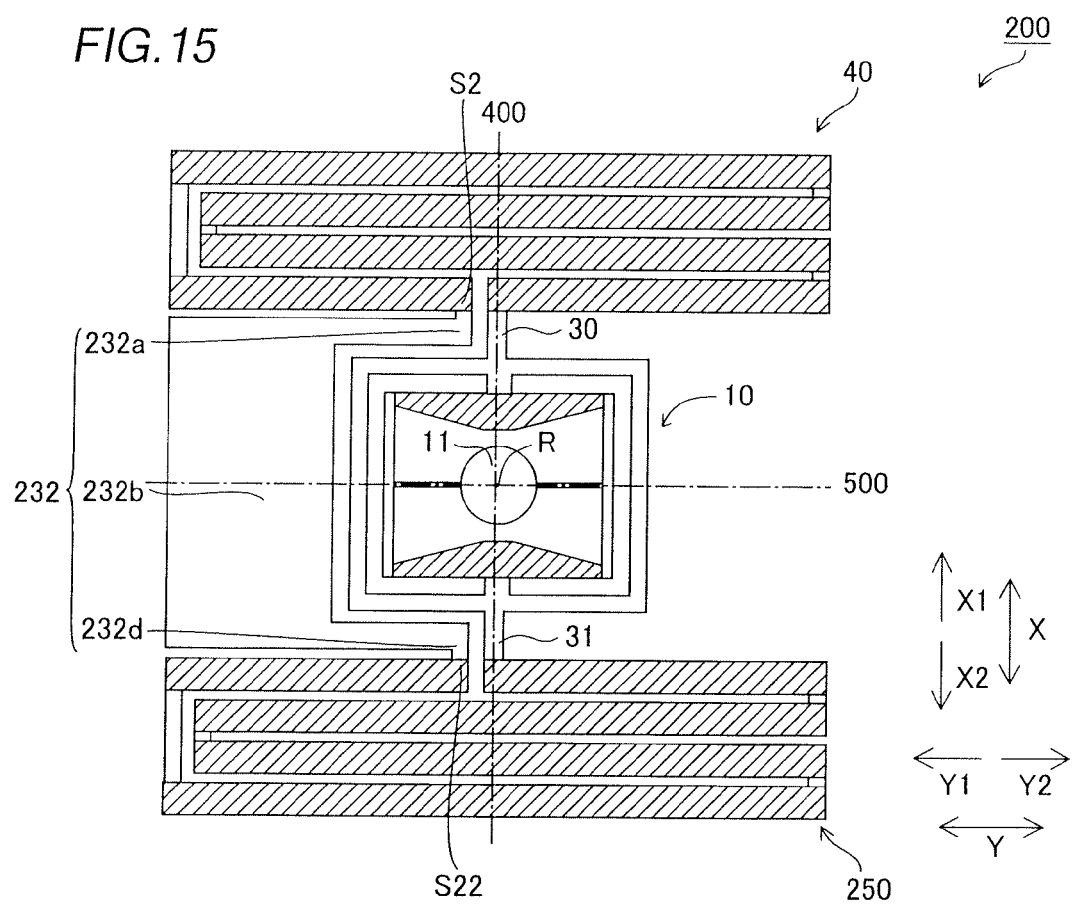
FIG. 15 is a plan view showing the structure of a vibrating mirror element according to a modification of the embodiment of the present invention.

For example, driving units 40 and 250 similar in structure to each other may alternatively be formed to be line-symmetrical to each other with respect to a symmetry axis 500 passing through the center R of a mirror 11 and extending in a direction Y, as in a vibrating mirror element 200 according to a modification of the embodiment shown in FIG. 15. In this case, a fixing portion 232 fixing fixed ends S2 and S22 of the driving units 40 and 250 may be provided on one side (along arrow Y1) of an A-directional optical scanning portion 10 in the direction Y. Thus, no fixing portion may be separately provided on a side of the A-directional optical scanning portion 10 along arrow Y2. As the specific structure, the fixing portion 232 provided on a side of the vibrating mirror element 200 along arrow Y1 is formed to be line-symmetrical with respect to the symmetry axis 500, and provided with support portions 232a and 232d on both end portions of a body portion 232b, formed on a side along arrow Y1, in a direction X. The support portion 232a provided on a side (along arrow X1) closer to the driving unit 40 is formed to fix the fixed end S2 of the driving unit 40 in the vicinity of a rotating shaft 30. The support portion 232d provided on a side (along arrow X2) closer to the driving unit 250 is formed to fix the fixed end S22 of the driving unit 250 in the vicinity of a rotating shaft 31. Thus, the vibrating mirror element 200 can be inhibited from size increase in the direction X, while the A-directional optical scanning portion 10 can be inhibited from inclining with respect to the fixed ends S2 and S22 in a state not driven by the driving units 40 and 250. Further, the substantially line-symmetrical driving units 40 and 250 and the substantially line-symmetrical rotating shafts 30 and 31 can support the A-directional optical scanning portion 10, whereby the A-directional optical scanning portion 10 can be stably supported, and can be inhibited from rotating on a rotating axis deviating from an axis 400. The symmetry axis 500 is an example of the "centerline" in the present invention.

While the driving units 40 and 50, the rotating shafts 30 and 31 and the fixing portions 32 and 33 are provided in pairs to hold the A-directional optical scanning portion 10 therebetween in the aforementioned embodiment, the present invention is not restricted to this. According to the present invention, the vibrating mirror element may alternatively be provided with one driving unit, one rotating shaft and one fixing portion.

While the end surface of the free end S1 of the driving portion 41 along arrow Y1 and the end surface of the fixed end S2 of the driving portion 45 along arrow Y2 are arranged to substantially overlap with each other as viewed from the direction Y in the aforementioned embodiment, the present invention is not restricted to this. According to the present invention, part of the end surface of the free end and part of the end surface of the fixed end may alternatively be arranged to overlap with each other as viewed from the direction Y. In other words, the end surfaces of the free end and the fixed end may simply be opposed to each other as viewed from the direction Y.

While the piezoelectric body 21 is made of lead zirconate titanate (PZT) in the aforementioned embodiment, the present invention is not restricted to this. For example, the piezoelectric body may alternatively be made of a piezoelectric material, other than PZT, consisting of an oxide mainly composed of lead, titanium and/or zirconium or another piezoelectric material. More specifically, the piezoelectric body may be made of a piezoelectric material such as zinc oxide (ZnO), lead lanthanate zirconate titanate ((Pb,La)(Zr,Ti)O$_3$), potassium niobate (KnBO$_3$) or sodium niobate (NaNbO$_3$), for example.

While the driving unit 40 is so formed that the four coupling support portions 46, 47, 48 and 49 connect the five driving portions 41, 42, 43, 44 and 45 with each other to constitute one driving portion in the aforementioned embodiment, the present invention is not restricted to this. According to the present invention, both of the free end and the fixed of the driving unit may simply be formed on the side of the driving unit closer to the A-directional optical scanning unit, and the driving unit may be so formed that two coupling support portions connect three driving portions with each other, for example.

While the thickness W1 of the coupling support portions 46 to 49 in the vertical direction (direction Z) is set larger than the thickness W2 of the driving portions 41 to 45 (excluding the free end S1, the fixed end S2 and the end portions S3 to S10) in the vertical direction and the thickness W4 of the fixed end S2 and the end portions S3 to S10 in the vertical direction is set larger than the thickness W2 of the driving portions 41 to 45 (excluding the free end S1, the fixed end S2 and the end portions S3 to S10) in the vertical direction in the aforementioned embodiment, the present invention is not restricted to this. According to the present invention, the thickness of the driving portions in the vertical direction may alternatively be set substantially equal to that of the end portions in the vertical direction.

While the inner driving portions 14a and 14b and the driving portions 41 to 45 and 51 to 55 include the piezoelectric element layers 2 each having the structure obtained by stacking the lower electrode 20, the piezoelectric body 21 and the upper electrode 22 in the aforementioned embodiment, the present invention is not restricted to this. According to the present invention, the inner driving portions and the driving portions may alternatively be formed to be driven by drivers other than the piezoelectric elements. For example, the inner driving portions and the driving portions may be driven by drivers, made of an elastomer, held between electrodes. In this case, a voltage is so applied between the electrodes that the electrodes attract each other thereby compressing and deforming the drivers made of the elastomer.

While the vibrating mirror element 100 including the A-directional optical scanning portion 10 and the B-directional optical scanning portion 20 is formed to two-dimensionally optically scan the object in the aforementioned embodiment, the present invention is not restricted to this. According to the present invention, the A-directional optical scanning portion may alternatively consist of only a mirror not to have inner driving portions, so that the vibrating mirror element is formed to only one-dimensionally optically scan the object.

What is claimed is:

1. A vibrating mirror element comprising:
   a mirror portion swingable on a first axis;
   a driving portion, including a free end and a fixed end, for swinging said mirror portion by deformation; and
   a shaft portion provided between said mirror portion and said driving portion to extend along said first axis for swingably supporting said mirror portion, wherein
   said free end of said driving portion is connected to said shaft portion, while said fixed end of said driving portion is fixed on a side of said driving portion closer to said mirror portion and in the vicinity of said shaft portion.

2. The vibrating mirror element according to claim 1, further comprising a fixing portion fixing said fixed end and including a fixed end support portion arranged between said mirror portion and said driving portion, wherein
   the length of said fixed end support portion in the extensional direction of said first axis is smaller than the length of said shaft portion in the extensional direction of said first axis.

3. The vibrating mirror element according to claim 2, wherein
   said fixing portion further includes a body portion arranged to be opposed to a side portion of said mirror portion extending along said first axis and a fixing portion connecting portion arranged between said mirror portion and said driving portion for connecting said body portion and said fixed end support portion with each other.

4. The vibrating mirror element according to claim 2, wherein
   an outer end portion of said fixing portion in a direction orthogonal to said first axis and an outer end portion of said driving portion in said direction orthogonal to said first axis are formed to substantially coincide with each other in said direction orthogonal to said first axis.

5. The vibrating mirror element according to claim 1, wherein
   said driving portion further includes a deformable first driving portion and a deformable second driving portion provided to extend in a direction orthogonal to said first axis,
   said first driving portion has said free end while said second driving portion has said fixed end, and
   an end surface of said free end of said first driving portion and an end surface of said fixed end of said second driving portion are formed to be opposed to each other in said direction orthogonal to said first axis.

6. The vibrating mirror element according to claim 1, wherein
   a pair of said driving portions and a pair of said shaft portions are provided on both sides of said mirror portion in the extensional direction of said first axis, to hold said mirror portion therebetween.

7. The vibrating mirror element according to claim 6, further comprising a fixing portion fixing said fixed end and including a fixed end support portion arranged between said mirror portion and said driving portions, wherein
   said fixing portion is formed to be held between said pair of driving portions in the extensional direction of said first axis.

8. The vibrating mirror element according to claim 6, further comprising a fixing portion fixing said fixed end and including a fixed end support portion arranged between said mirror portion and said driving portions, a body portion arranged to be opposed to a side portion of said mirror portion extending along said first axis and a fixing portion connecting portion arranged between said mirror portion and said driving portions for connecting said body portion and said fixed end support portion with each other, wherein
   a pair of said fixing portions are provided, and said body portions of said pair of fixing portions are provided on both sides of said mirror portion in a direction orthogonal to said first axis, to hold said mirror portion therebetween.

9. The vibrating mirror element according to claim 1, wherein
said driving portion further includes:
a deformable first driving portion, a deformable second driving portion and a deformable third driving portion provided to extend in a direction orthogonal to said first axis, and
a first connecting portion connecting said first driving portion and said third driving portion with each other and a second connecting portion connecting said second driving portion and said third driving portion with each other,
said first driving portion has said free end while said second driving portion has said fixed end, and
one end of said third driving portion is connected to an end portion of said first driving portion opposite to said free end through said first connecting portion while another end of said third driving portion is connected to an end portion of said second driving portion opposite to said fixed end through said second connecting portion.

10. The vibrating mirror element according to claim 9, wherein
the thicknesses of said connecting portions are in excess of the thickness of said first driving portion and the thickness of said second driving portion.

11. The vibrating mirror element according to claim 9, wherein
said third driving portion is arranged on a side of said first driving portion and said second driving portion opposite to said mirror portion.

12. The vibrating mirror element according to claim 9, wherein
the length of said third driving portion in said direction orthogonal to said first axis is larger than the length of said first driving portion in said direction orthogonal to said first axis and the length of said second driving portion in said direction orthogonal to said first axis.

13. The vibrating mirror element according to claim 12, wherein
said third driving portion extends in said direction orthogonal to said first axis, to extend over said first driving portion and said second driving portion.

14. The vibrating mirror element according to claim 9, wherein
said third driving portion has at least three deformable driving portions provided to extend in said direction orthogonal to said first axis,
said at least three driving portions are connected with said first driving portion in a manner folded through said first connecting portion or connected with adjacent said driving portions in a manner folded through said third connecting portion on one side in said direction orthogonal to said first axis, and
said at least three driving portions are connected with said second driving portion in a manner folded through said second connecting portion or connected with adjacent said driving portions in a manner folded through a fourth connecting portion on another side in said direction orthogonal to said first axis.

15. The vibrating mirror element according to claim 6, wherein
said pair of driving portions are formed to be substantially point-symmetrical to each other with respect to the center of said mirror portion, while said pair of shaft portions are formed to be substantially point-symmetrical to each other with respect to the center of said mirror portion.

16. The vibrating mirror element according to claim 6, wherein
said pair of driving portions extend in said direction orthogonal to said first axis and are formed to be substantially line-symmetrical to each other with respect to a centerline passing through the center of said mirror portion, while said pair of shaft portions are formed to be substantially line-symmetrical to each other with respect to said centerline.

17. The vibrating mirror element according to claim 1, wherein
said mirror portion, said driving portion and said shaft portion are integrally formed.

18. The vibrating mirror element according to claim 1, wherein
said mirror portion includes a mirror and a mirror portion-side driving portion swinging said mirror on a second axis extending in a direction orthogonal to said first axis in an in-plane direction of said mirror.

19. The vibrating mirror element according to claim 18, wherein
said driving portion is formed to swing said mirror portion on said first axis at a first frequency, and
said mirror portion-side driving portion is formed to swing said mirror on said second axis at a second frequency higher than said first frequency.

20. An optical scanner comprising:
a light source; and
an optical scanning portion including a vibrating mirror element, wherein
said vibrating mirror element includes a mirror portion swingable on a first axis, a driving portion, including a free end and a fixed end, for swinging said mirror portion by deformation and a shaft portion provided between said mirror portion and said driving portion to extend along said first axis for swingably supporting said mirror portion, and said free end of said driving portion is connected to said shaft portion, while said fixed end of said driving portion is fixed on a side of said driving portion closer to said mirror portion and in the vicinity of said shaft portion.

* * * * *